Yoshihisa Maitani
Inventor
By Wenderoth, Lind
and Ponack.
Attorneys

United States Patent Office 3,075,441
Patented Jan. 29, 1963

3,075,441
EXPOSURE CONTROLLING DEVICE FOR
PHOTOGRAPHIC CAMERA
Yoshihisa Maitani, Tokyo, Japan, assignor to Olympus
Kogaku Kogyo Kabushiki Kaisha, Tokyo, Japan, a corporation of Japan
Filed Nov. 28, 1961, Ser. No. 155,442
Claims priority, application Japan Dec. 6, 1960
8 Claims. (Cl. 95—10)

This invention relates generally to a photographic camera and more particularly to a device for controlling an exposure of such a camera in accordance with an indication of the exposure meter.

There has been already known a photographic camera of the type including therein an exposure meter and an exposure controlling device comprising a movable rod provided with a cam edge adapted to press an indicating pointer of the exposure meter against a holding stationary member upon the movement of the rod, the magnitude of movement of the rod being utilized to adjust a diaphragm mechanism to a stop number suitable for providing the proper or optimum exposure dependent upon the position of the displaced pointer of the exposure meter. However, in this type of the photographic camera the proper exposure controlled by varying the diaphragm aperture can be provided only for a relatively narrow range of light values for objects to be photographed, particularly when the exposure time is fixed. It is desirable to widen the range of light values for the objects so an exposure controlling device can respond thereby controlling exposure mechanisms to provide the proper exposure.

Therefore, an object of the invention is to provide, in a photographic camera including therein an exposure meter, a new and improved exposure controlling device responsive to the operation of the exposure meter for controlling an exposure properly over a range of light values wider than that which could be heretofore obtained for objects to be photographed.

According to one aspect of the invention there is provided an exposure controlling device for simultaneously controlling an exposure time and a diaphragm aperture of a photographic camera in accordance with an indication of an exposure meter contained in the camera, said device comprising an operating member operatively connected to means for releasing shutter means, and a pair of rockable lever members resiliently engaging said operating member and including control elements for controlling the exposure time and the diaphragm aperture respectively, each of said lever members being provided with a protrusion adapted to press an indicator element of the exposure meter against a holding stationary member to hold the indicator element against the same upon the operation of said operating member. The protrusion formed on one of said lever members for controlling the exposure time comprises a plurality of steps each prescribing for different one of differently predetermined exposure times while the protrusion formed on the other lever member for controlling the diaphragm aperture comprises saw-teeth equal in number to the steps of the first protrusion with each of the saw-teeth aligned and coextensive with the mating one of the steps. Further each of the saw-teeth is tilted in such a manner that, in accordance with the position of the indicator element relative to the adjacent saw-tooth, the diaphragm aperture is adjusted to a stop number proper with respect to an exposure time determined by the mating step of the first protrusion. Thus the magnitudes of rocking or rotational movement of both lever members due to the operation of the operating member are utilized to provide the proper or optimum exposure dependent upon the position of the indicator element relative to the pressing edges of the protrusions on both lever members.

The pair of lever members may be constructed and arranged such that the first and second protrusions will affect synchronously the indicator element. Alternatively the first protrusion may first press the indicator element against the holding stationary member to prevent any movement of the indicator element and then the second protrusion may engage the indicator element.

According to another aspect of the invention said first protrusion on the one lever member for controlling the exposure time may comprise a single, relatively short pressing edge located along only one portion of the movement passage of said indicator element and mating with a preselected one of the saw teeth of the second protrusion formed on the other lever member for controlling the diaphragm aperture. If the indicator element will not be positioned above both said single pressing edge of the first protrusion and the mating saw tooth of the second protrusion then said one lever member can be freely rocked to set a shutter mechanism to a different exposure time without a fear that the first protrusion would contact the indicator element.

The invention will become more readily apparent from the following detailed description taken in conjunction with the accompanying drawings in which.

Throughout the drawings like reference numerals designate similar components.

Figure 1:
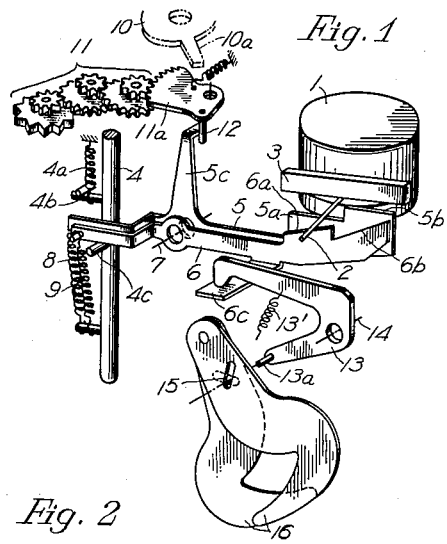
FIG. 1 shows schematically a perspective view of an exposure controlling device constructed in accordance with the teaching of the invention.

Referring now to FIG. 1 of the drawings, there is illustrated an exposure controlling device constructed in accordance with the teachings of the invention. An exposure meter contained in a housing of a photographic camera (not shown) comprises a photocell (not shown) and a galvanometer 1 electrically connected to the same. The galvanometer 1 includes an indicating pointer 2 adapted to be moved in accordance with an amount of light falling upon the photocell from an object to be photographed. In other words, the pointer 2 indicates a light value corresponding to a brightness of the object. It is assumed that, as the amount of light falling upon the photocell is increased the indicating pointer 2 will be moved from the right toward the left as viewed in FIG. 1. Disposed adjacent and substantially parallel to the movement passage of the indicating pointer 2 is a holding stationary plate 3. An operating rod 4 for releasing a shutter (not shown) is disposed for longitudinal movement and normally biased upwardly by a spring 4a having one end suitably secured to the housing and the other end hooked to a projection 4b formed on the rod. The operating rod 4 is adapted to be driven directly or indirectly by a shutter releasing pushbutton or the like (not shown).

According to the invention an exposure controlling device is disposed between the operating rod 4 and the galvanometer 1. More specifically, a pair of aligned levers 5 and 6 are pivotably mounted on a common shaft diagramatically designated at dotted-and-dashed line 7. One of the levers 5 (which is referred to as a first lever) includes one arm resiliently engaging the operating rod 4 on a projection 4c extending laterally from the same, by the action of a tensioning spring 8, to press against the projection and includes the other arm having a free end portion which is provided on the upper side (as viewed in FIG. 1) with a stepped protrusion comprising two steps 5a and 5b different in lever from each other.

Similarly, the other lever 6 (which is referred to as a second lever) includes one arm resiliently engaging and pressing against the projection 4c on the operating rod 4 by the action of a tensioning spring 9 and the other arm having its free end portion which is provided on the upper side with a saw-toothed protrusion. As shown in FIG. 1, this protrusion compises a pair of saw teeth 6a and 6b which, in turn are aligned and coextensive with the mating steps 5a and 5b.

The first lever 5 includes further a branch arm 5c projecting from the same substantially at the position of its fulcrum 7 while the second lever 6 is provided on the other arm with a branch arm 6c extending forwardly as viewed in FIG. 1 and substantially perpendicularly to the plane of the lever.

On the upper portion in FIG. 1, a member 10 operatively coupled to a shutter operating element (not shown) is shown at dotted-and-dashed line. The member 10 includes a projection 10a adapted to be moved along a passage on which a side edge or projection of a toothed sector 11a is positioned. The toothed sector 11a forms a first gear of a gear train 11 for adjusting a shutter speed. The gear train 11 may be of well known type. The toothed sector 11a is provided with a pin 12 adapted to engage the bent end portion of the branch arm 5c.

As shown in FIG. 1 the branch arm 6c of the second lever 6 includes its free end portion on which one end of a bell crank 13 rests lightly. The bell crank 13 is pivotably mounted to its fulcrum schematically designated at dotted-and-dashed line 14 and normally biased in the counterclockwise direction as viewed in FIG. 1 by the action of a spring 13'. The bell crank 13 includes on the other end thereof a pin 13a adapted to be loosely fitted into a throughout opening 15 formed of a pair of cross slots formed on a pair of diaphragm blades of substantially sickle shape 16 adjacent to a position where the blades are pivotably mounted to a stationary pin (not shown) in the housing of the camera. The pair of diaphragm blades 16 are provided on those end portions thereof opposite to the pivoted end portion with opposed recesses to provide a diaphragm aperture.

If a photographic camera including the device thus far described is turned to an object to be photographed then the indicating pointer 2 of the galvanometer 1 will be moved to a position corresponding to an amount of light falling from the object upon the exposure meter that is to say, to a light value indicated by the exposure meter. Under these circumstances, the depression of the operating rod 4 effects the counterclockwise movement, as viewed in FIG. 1, of the levers 5 and 6 about the common fulcrum 7 by the action of the springs 8 and 9 whereby a pair of the mating operating edges 5a and 6a or 5b and 6b respectively of the levers 5 and 6 will press the indicating pointer 2 against the holding plate 3 to hold the pointer against the same. This prevents further rocking or rotational movement of the levers 5 and 6.

It is to be noted that each of two pairs of mating operating edges of both levers is constructed and arranged such that they affect synchronously the indicating pointer or that each of the operating edges of the lever 5 presses first the pointer against the holding plate to thereby prevent the same from rocking and thereafter the mating edge of the lever 6 presses the pointer against the holding plate.

It is also noted that each of the straight edges 5a and 5b of the lever 5 is adapted to be positioned in substantially parallel relationship to the lower side of the holding plate 3 when the operated edge of the lever 5 is pressing the indicating pointer 2 against the holding plate.

The rotational movement of the lever 5 in the counterclockwise direction effects the rotational movement of the pin 12 through the branch arm 5c of the same to set a shutter mechanism to a predetermined exposure time. Simultaneously with the movement of the lever 5 or immediately thereafter the lever 6 is rotated similarly in the counterclockwise direction to effect the rocking movement of the bell crank 13 about its fulcrum 14 to drive the diaphragm blades 15 through the pin 13a and the opening 14.

As previously described, the operating edge 5b of the lever 5 is normally positioned nearer to the lower side of the holding plate 3 than the other edge 5a. Therefore, the lever 5 can be angularly displaced through different angles dependent upon which of the operating edges 5a and 5b the pointer 2 will face. Thus, if the pointer will be positioned above the edge 5b the rotational movement of the lever may set the shutter mechanism to one of differently predetermined shutter speeds, for example, to a slow shutter speed whereas the pointer positioned above the edge 5a may set the mechanism to a fast shutter speed.

Since a distance between the holding plate 3 and each of the saw teeth 6a and 6b of the lever 6 at its normal position is lengthwise changed the magnitude of angular displacement of the lever 6 is varied dependent upon the position of the pointer relative to the adjacent saw tooth. Therefore, it will be understood the diaphragm aperture determined by the relative positions of the diaphragm blades 15 can be controlled by the position of the indicating pointer 2 relative to the adjacent saw tooth 6a or 6b.

After the exposure time and the diaphragm aperture have been set in the manner as above described the operating rod 4 can be further depressed to operate the shutter mechanism to provide an exposure determined by the resulting exposure time and diaphragm aperture.

It is to be noted that the operating edges 6a and 6b of the lever 6 are chosen to be tilted with respect to the movement passage of the indicating pointer 2 or to the lower side of the holding plate 3 such that, with an exposure time determined by either of the operating edges of the lever 5 above which the pointer is positioned, a diaphragm aperture or stop number determined by that point on the associated saw tooth of the lever 6 facing the pointer is ready for the proper exposure for any light value indicated by the position of the displaced pointer.

With the arangement illustrated in FIG. 1 and if pointer 2 will reach a point corresponding to the transition point between the operating edges of each lever, or if the pointer will indicate a predetermined light value then the exposure time provided by the shutter mechanism will be changed. On the other hand, the diaphragm aperture can be varied in accordance with the position of the pointer 2 relative to each operating edge of the lever 6. Accordingly, after the exposure time has been changed the diaphragm apertures used previously before this change did not occur can be again used for the changed exposure time. As an example, the case where a photosensitive member having its sensitivity of ASA 100 is used is tabulated in Table I.

Table I

| Light value indicated by the pointer 2 | First stage | | | | | Second stage | | | | |
|---|---|---|---|---|---|---|---|---|---|---|
| | 8 | 9 | 10 | 11 | 12 | 13 | 14 | 15 | 16 | 17 |
| Exposure time in second | 1/30 | 1/30 | 1/30 | 1/30 | 1/30 | 1/500 | 1/500 | 1/500 | 1/500 | 1/500 |
| Stop numbers | f/2.8 | f/4 | f/5.6 | f/8 | f/11 | f/4 | f/5.6 | f/8 | f/11 | f/16 |

REMARKS.—At the first stage the indicating pointer lies above the operating edges 5b and 6b while at the second stage the pointer lies above the operating edges 5a and 6b.

While the invention has been described in conjunction with the controlling levers each having two operated edges it will be understood that each of the levers may be provided with any desired number of operating edges dependent upon a number of exposure times required. As an example, if each of the levers will include three operating edges an exposure time may be combined with a stop number for a light value indicated by the pointer 2 as shown in Table II.

Table II

| | First stage | | | Second stage | | | | Third stage | | |
|---|---|---|---|---|---|---|---|---|---|---|
| Light value | 8 | 9 | 10 | 11 | 12 | 13 | 14 | 15 | 16 | 17 |
| Exposure time in seconds | 1/30 | 1/30 | 1/30 | 1/125 | 1/125 | 1/125 | 1/125 | 1/500 | 1/500 | 1/500 |
| Stop number | f/2.8 | f/4 | f/5.6 | f/4 | f/5.6 | f/8 | f/11 | f/8 | f/11 | f/16 |

It will be appreciated that the slope of each operating edge of the lever 6 can readily been constructed to adjust the diaphragm mechanism to the indicated stop numbers for the indicated light values respectively.

Figure 2:
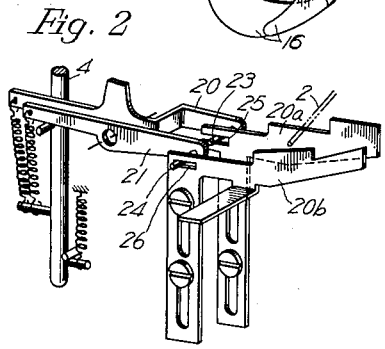
FIG. 2 shows schematically a perspective view of a modification of the device illustrated in FIG. 1 with certain component omitted.

Referring now to FIG. 2 of the drawings, there is illustrated a modification of the exposure controlling device shown in FIG. 1. An exposure controlling device illustrated comprises a pair of aligned levers corresponding to levers 5 and 6 in FIG. 1 each including one two part arm adapted to be operatively coupled to a shutter mechanism (not shown) or diaphragm mechanism (not shown) with the remaining portions substantially similar to the corresponding portions of the device shown in FIG. 1. As shown in FIG. 2, each of the two-part arms includes an arm portion 20 or 21 integral with the other arm and an arm portion 20a or 20b adjustably connected to the one arm portion. To this end, a pin 23 or 24 provided on the integral arm portion at its free end may be fitted into a notch 25 or a slot 26 formed on the movable arm portion at one end.

Figure 3:
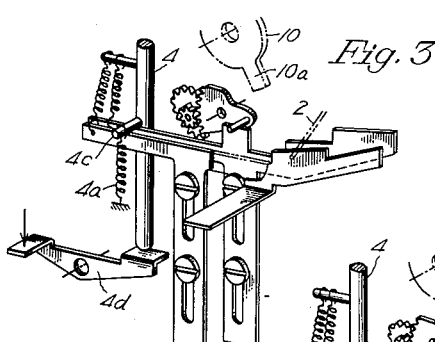
FIG. 3 shows schematically a perspective view of another modification of the device illustrated in FIG. 1 with certain components omitted.

An arrangement illustrated in FIG. 3 is substantially similar to that shown in FIG. 1 except that a pair of controlling levers corresponding to levers 5 and 6 in FIG. 1 engage an operating rod 4 for a shutter (not shown) on the underside of a projection 4c secured thereto and that the rod 4 is normally biased downwardly by the action of spring 4a. The operating rod 4 includes its lower end engaging an intermediate lever 4d at one end which, in turn includes the other end adapted to be depressed directly or indirectly by a shutter-pushbutton (not shown) in the direction of arrow illustrated in FIG. 3. The depression of the other end of the intermediate lever 4d tends to move upwardly the operating rod 4 to thereby allow the pair of the controlling levers 5 and 6 in the counterclockwise direction as viewed in FIG. 3. Therefore, it will be apparent that the exposure controlling device shown in FIG. 3 will be operated in the same manner as does the device previously described in conjunction with FIG. 1.

Figure 4:
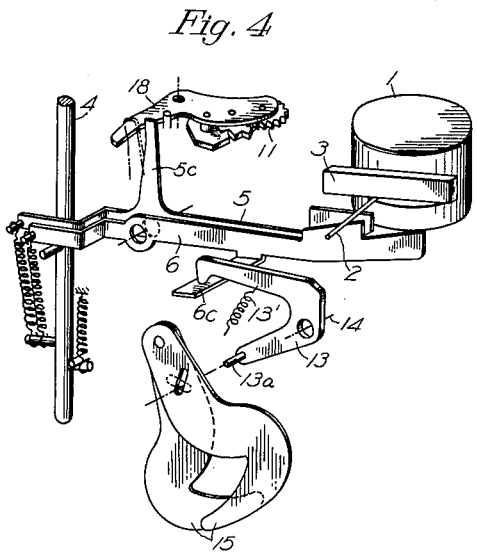
FIG. 4 shows a view similar to FIG. 1 and illustrating an exposure controlling device having a somewhat simple construction.

Referring now to FIG. 4 of the drawings, there is illustrated another form of an exposure controlling device constructed in accordance with the teachings of the invention. The controlling device of FIG. 4 is different from that shown in FIG. 1 in that a first controlling lever 5 is provided at its free end with a single operating edge corresponding to edge 5a in FIG. 1 adapted to cooperate only with one saw tooth corresponding to tooth 6a in FIG. 1 on a saw-toothed protrusion formed on a second controlling lever 6. It is here again noted that both levers 5 and 6 are constructed and arranged such that the operating edge 5a and the mating operating edge 6a affect synchronously an indicating pointer 2 of a galvanometer 1, or that the edge 5a first presses the pointer 2 against a holding plate 3 and then the edge 6a presses the pointer against the holding plate. It is also to be noted that the lever 5 does not include an operating edge adapted to cooperate with the other saw tooth 6b of the protrusion formed on the lever 6.

With the arrangement illustrated in FIG. 4, it is assumed that a shutter mechanism (not shown) is set to perform its inherent high speed operation whenever the operating edge 5a on the lever 5 will press the indicating pointer 2 against the holding plate 3. If the pointer will swing into a range of rotational movement where the operating edge portion corresponding to portion 6b in FIG. 1 on the lever 6 is effective to press the same against the holding plate, the depression of an operating rod 4 will effect counterclockwise movement (as viewed in FIG. 4) of the first lever 5 about its fulcrum 7 without contacting the pointer. Thereby a branch arm 5c formed on the first lever 5 is turned similarly in the counterclockwise direction to actuate an arm of a supporting member 18 for supporting a slow speed gear train 11 for performing low speed operation of a shutter mechanism with the result that a shutter (not shown) is operated at a low speed. Following the first lever 5 the second lever 6 will press the pointer 2 against the holding plate 3 to adjust a diaphragm aperture to the proper stop number determined for the shutter speed obtained at that time in the same manner as previously described in conjunction with FIG. 1.

Figure 5:
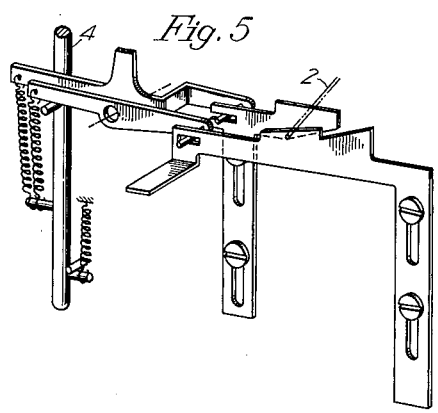
FIG. 5 shows a view similar to FIG. 2 and illustrating a modification of the device of FIG. 4.

FIG. 5 illustrates a modification of the exposure controlling device shown in FIG. 4. By comparing FIG. 2 with FIG. 5 it can be seen that the only difference between the arrangements shown in FIGS. 2 and 5 respectively is that the former includes the first lever corresponding to lever 5 in FIG. 1 provided on its free end portion with a stepped edge whereas the latter includes a first lever provided on its free end portion with a single operating edge.

Figure 6:
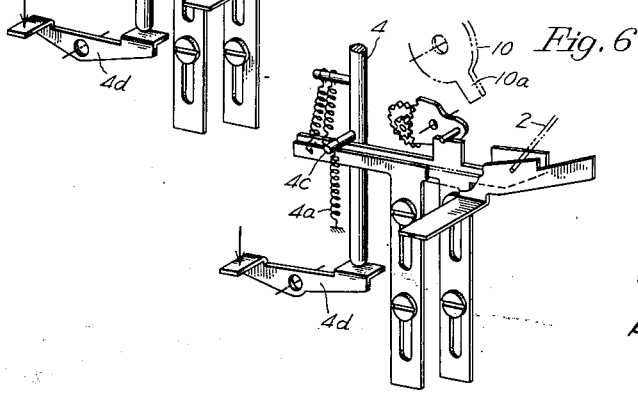
FIG. 6 shows a view similar to FIG. 3 and illustrating another modification of the device of FIG. 4.

Similarly, an arrangement shown in FIG. 6 is different from that shown in FIG. 3 in the construction of a first lever which is identical with the construction of the first lever 5 as just described in conjunction with FIG. 5.

From the foregoing it will be appreciated that the present invention can effect the proper exposure for any of light values of objects to be photographed which may be varied over a wide range, only by changing slightly an exposure time without any variation in ranges over which an indicating pointer of an exposure meter and diaphragm blades or sectors can be displaced respectively.

Also it will be appreciated that in the exposure controlling device shown in each of FIGS. 4 to 6 the second lever includes an operating edge of simple construction.

While the invention has been described in conjunction with certain preferred embodiments thereof it is to be understood that various changes and modifications may be made without departing from the spirit and scope of the invention. For example, the invention is equally applicable to the iris type of diaphragm device.

What I claim is:

1. In an exposure controlling device for simultaneously controlling an exposure and a diaphragm aperture of a photographic camera in accordance with an indication of an exposure meter contained in the camera, the combination of an operating member operatively connected to means for releasing shutter means, and a pair of rockable lever members resiliently engaging said operating member and including control elements for controlling the exposure time and the diaphragm aperture respectively, each of said lever members being provided with a protrusion adapted to press an indicator element of the exposure meter against a holding stationary member to hold the indicator element against the same upon the operation of said operating member, said protrusion on one of said lever members for controlling the exposure time comprising a plurality of steps each prescribing for a different one of different predetermined exposure times while said protrusion on the other lever member for controlling the diaphragm aperture comprises saw teeth equal in number to said steps of the first protrusion with each of said saw teeth aligned and coextensive with the mating one of said steps and with each of the saw teeth tilted in such a manner that, in accordance with the position of the indicator element relative to the adjacent saw tooth the diaphragm aperture is adjusted to a stop number proper with respect to an exposure time determined by the mating step of the protrusion on said one lever member.

2. A device as claimed in claim 1, wherein said protrusions formed on the pair of said lever members affect synchronously the indicator element upon the operation of said operating member.

3. A device as claimed in claim 1, wherein said protrusion formed on said one lever member presses first the indicator element against said holding stationary member to prevent any movement of the same and then said protrusion formed on said other lever member presses the indicator element against said holding member.

4. In an exposure controlling device for simultaneously controlling an exposure and a diaphragm aperture of a photographic camera in accordance with an indication of an exposure meter contained in the camera, the combination of an operating member operatively connected to means for releasing shutter means, and a pair of rockable lever members resiliently engaging said operating member and including control elements for controlling the exposure time and the diaphragm aperture respectively, each of said lever members being provided with a protrusion adapted to press an indicator element of the exposure meter against a holding stationary member to hold the indicator element against the same upon the operation of said operating member, said protrusion on one of said lever members for controlling the exposure time comprising a single, relatively short pressing edge located along only one portion of the movement passage of the indicator element and prescribing for a predetermined exposure time, the remaining portion of said movement passage of the indicator element prescribing for another predetermined exposure time, said protrusion on the other lever member for controlling the diaphragm aperture comprising a plurality of saw teeth the preselected one of which aligns and mates with said single pressing edge, the positioning of the indicator element on said remaining portion of movement passage thereof allowing said one lever member to be rocked without contacting the indicator element whereby said another predetermined exposure time is set.

5. A device as claimed in claim 4, wherein said protrusions formed on the pair of said lever members affect synchronously the indicator element upon the operation of said operating member.

6. A device as claimed in claim 4, wherein said protrusion formed on said one lever member presses first the indicator element against said holding stationary member to prevent any movement of the same and then said protrusion formed on said other lever member presses the indicator element against said holding member.

7. A device as claimed in claim 1, wherein each of said lever members includes one arm comprising an arm portion integral with the main body of the lever and another arm portion adjustably connected to said arm portion and provided with the said protrusion.

8. A device as claimed in claim 4, wherein each of said lever members includes one arm comprising an arm portion integral with the main body of the lever and another arm portion adjustably connected to said arm portion and provided with the said protrusion.

References Cited in the file of this patent

UNITED STATES PATENTS

| | | |
|---|---|---|
| 2,981,164 | Durst | Apr. 25, 1961 |
| 2,990,758 | Sauer | July 4, 1961 |